US008249870B2

(12) United States Patent
Roy et al.

(10) Patent No.: US 8,249,870 B2
(45) Date of Patent: Aug. 21, 2012

(54) SEMI-AUTOMATIC SPEECH TRANSCRIPTION

(75) Inventors: Brandon Cain Roy, Cambridge, MA (US); Deb Kumar Roy, Arlington, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 832 days.

(21) Appl. No.: 12/269,207

(22) Filed: Nov. 12, 2008

(65) Prior Publication Data

US 2010/0121637 A1     May 13, 2010

(51) Int. Cl.
*G10L 15/00* (2006.01)
*G10L 15/06* (2006.01)
*G10L 15/04* (2006.01)
*G10L 15/18* (2006.01)
*G10L 11/00* (2006.01)
*G10L 21/00* (2006.01)
*G10L 21/06* (2006.01)

(52) U.S. Cl. ........ 704/244; 704/231; 704/232; 704/243; 704/251; 704/257; 704/270; 704/270.1; 704/275; 704/276

(58) Field of Classification Search .................. 704/232, 704/243, 251, 257, 270, 244, 231, 270.1, 704/275, 276
See application file for complete search history.

(56) References Cited

U.S. PATENT DOCUMENTS

| | | | | |
|---|---|---|---|---|
| 5,799,273 | A * | 8/1998 | Mitchell et al. | 704/235 |
| 6,067,517 | A * | 5/2000 | Bahl et al. | 704/256.4 |
| 6,161,087 | A * | 12/2000 | Wightman et al. | 704/215 |
| 6,332,147 | B1 * | 12/2001 | Moran et al. | 715/203 |
| 6,360,237 | B1 * | 3/2002 | Schulz et al. | 715/255 |
| 6,421,645 | B1 * | 7/2002 | Beigi et al. | 704/272 |
| 6,865,258 | B1 * | 3/2005 | Polcyn | 379/88.01 |
| 6,952,673 | B2 * | 10/2005 | Amir et al. | 704/235 |
| 6,961,699 | B1 * | 11/2005 | Kahn et al. | 704/235 |
| 6,970,860 | B1 * | 11/2005 | Liu et al. | 1/1 |
| 7,440,895 | B1 * | 10/2008 | Miller et al. | 704/244 |
| 7,836,412 | B1 * | 11/2010 | Zimmerman | 715/827 |

(Continued)

OTHER PUBLICATIONS

Deb Roy, Rupal Patel, Philip DeCamp, Rony Kubat, Michael Fleischman, Brandon Roy, Nikolaos Mavridis, Stefanie Tellex, Alexia Salata, Jethran Guinness, Michael Levit, Peter Gorniak. (Jul. 26-29, 2006). The Human Speechome Project. Proceedings of the 28th Annual Meeting of the Cognitive Science Society, Vancouver, British Columbia, Canada.*

Kubat et al.,"TotalRecall: Visualization and semi-automatic annotation of very large audio-visual corpora," in ICMI, 2007.*

*Primary Examiner* — Douglas Godbold
*Assistant Examiner* — Edgar Guerra-Erazo
(74) *Attorney, Agent, or Firm* — Stephen Otis

(57) ABSTRACT

A semi-automatic speech transcription system of the invention leverages the complementary capabilities of human and machine, building a system which combines automatic and manual approaches. With the invention, collected audio data is automatically distilled into speech segments, using signal processing and pattern recognition algorithms. The detected speech segments are presented to a human transcriber using a transcription tool with a streamlined transcription interface, requiring the transcriber to simply "listen and type". This eliminates the need to manually navigate the audio, coupling the human effort to the amount of speech, rather than the amount of audio. Errors produced by the automatic system can be quickly identified by the human transcriber, which are used to improve the automatic system performance. The automatic system is tuned to maximize the human transcriber efficiency. The result is a system which takes considerably less time than purely manual transcription approaches to produce a complete transcription.

11 Claims, 11 Drawing Sheets

U.S. PATENT DOCUMENTS

| | | | |
|---|---|---|---|
| 7,962,341 B2* | 6/2011 | Braunschweiler | 704/258 |
| 2003/0216905 A1* | 11/2003 | Chelba et al. | 704/9 |
| 2004/0006481 A1* | 1/2004 | Kiecza et al. | 704/276 |
| 2005/0028194 A1* | 2/2005 | Elenbaas et al. | 725/32 |
| 2005/0114131 A1* | 5/2005 | Stoimenov et al. | 704/251 |
| 2005/0183109 A1* | 8/2005 | Basson et al. | 725/4 |
| 2009/0292541 A1* | 11/2009 | Daya et al. | 704/251 |

* cited by examiner

| | | |
|---|---|---|
| | BlitzScribe - 01/14/2007 15:03:35:271 PM duration 10 minutes | |
| | F1 F2 F3 F4   Quit  Open  Save   Done   Help | Not Not Too Cut speech clear long off F5 F6 F7 F8 |
| 1 ▶ | where are the windows on the car | ☐ ☐ ☐ ☐ |
| 2 ▶ | you see the windows | ☐ ☐ ☐ ☐ |
| 3 ▶ | windows | ☐ ☐ ☐ ☐ |
| 4 ▶ | and the wheels | ☐ ☐ ☐ ☐ |
| 5 ▶ | yeah | ☐ ☐ ☐ ☐ |
| 6 ▶ | the wheels on the car go so fast | ☐ ☐ ☐ ☐ |
| 7 ▶ | that's cause they're race cars | ☐ ☐ ☐ ☐ |
| 8 ▶ | ii    ← 1101 | ☐ ☐ ☐ ☐ |
| 9 ▶ | | 1102→ ☑ ☐ ☐ ☐ |
| 10 ▶ | the wheels    ← 1103 | ☐ ☐ ☐ ☐ |
| 11 ▶ | on the car go round and round | ☐ ☐ ☐ ☐ |
| 12 ▶ | | ☐ ☐ ☐ ☐ |
| 13 ▶ | | ☐ ☐ ☐ ☐ |
| 14 ▶ | | ☐ ☐ ☐ ☐ |
| 15 ▶ | | ☐ ☐ ☐ ☐ |
| 16 ▶ | | ☐ ☐ ☐ ☐ |
| 17 ▶ | | ☐ ☐ ☐ ☐ |
| 18 ▶ | | ☐ ☐ ☐ ☐ |

Fig. 11

SEMI-AUTOMATIC SPEECH TRANSCRIPTION

STATEMENT REGARDING FEDERALLY SPONSORED RESEARCH OR DEVELOPMENT

Not applicable.

REFERENCE TO A SEQUENCE LISTING

Not applicable.

BACKGROUND OF THE INVENTION

1. Field of the Invention

The invention relates to speech transcription, and more particular to improving speech transcription through a human-machine collaboration system.

2. Description of Related Art

Quickly and reliably producing written speech transcripts is an essential component of many enterprises, from language acquisition research to new tools for spoken note taking. Transcription tools have been in use for decades, but unfortunately their development has not kept pace with the progress in recording and storage systems. It is easier and cheaper than ever to collect a massive multimedia corpus, but as the size of the dataset grows so does the challenge of producing high quality, comprehensive annotations. Speech transcripts, among other annotations, are critical for navigating and searching many multimedia datasets.

Speech transcription technologies can be divided into two basic categories: entirely manual and entirely automatic. Manual speech transcription relies on a human to listen to audio and produce a written transcript. Entirely automatic methods replace the human with software that can process an audio stream into a textual output. Automatic speech recognition technologies are finding their way into some everyday applications, such as telephone-based menu systems, but accuracy and robustness are still limitations. For example, a telephone based system for checking airline flight status can be structured to limit the range of spoken responses by a user, and can be successful while only recognizing a few words. This is a very different challenge from recognizing spontaneous speech in a natural, person-person dialog. In addition, contextual knowledge and other cues that enable a person to resolve ambiguities and accurately transcribe speech are often missing from current speech recognition systems. If accurate transcription of natural speech is the goal, entirely manual systems hold many advantages, but their disadvantage is the high price in terms of human labor. Entirely manual transcription is surprisingly time consuming, and it is not uncommon for the human effort to take an order of magnitude longer than the actual audio duration. Especially for today's massive corpora, an improved methodology is needed. The invention addresses this need.

BRIEF SUMMARY OF THE INVENTION

A semi-automatic speech transcription system of the invention leverages the complementary capabilities of human and machine, building a system which combines automatic and manual approaches. With the invention, collected audio data is automatically distilled into speech segments, using signal processing and pattern recognition algorithms. The detected speech segments are presented to a human transcriber using a transcription tool with a streamlined transcription interface, requiring the transcriber to simply "listen and type". This eliminates the need to manually navigate the audio, coupling the human effort to the amount of speech, rather than the amount of audio. Errors produced by the automatic system can be quickly identified by the human transcriber, which are used to improve the automatic system performance. The automatic system is tuned to maximize the human transcriber efficiency. The result is a system which takes considerably less time than purely manual transcription approaches to produce a complete transcription.

In a method aspect, the invention comprises: receiving audio by an automatic speech detection component; automatically detecting speech in the audio by the automatic speech detection component; providing by the automatic speech detection component the detected speech as a plurality of speech segments to a transcription tool; providing by the transcription tool each of the plurality of speech segments to a user via a transcription interface; and receiving by the transcription tool via the transcription interface an indication for each of the plurality of speech segments from the user, wherein the indication comprises a transcription of the speech segment or an indication of non-speech for the speech segments.

The automatically detecting comprises: partitioning the audio into a plurality of frames; calculating a feature vector for each of the plurality of frames; classifying each of the plurality of frames as speech or non-speech based on the feature vector corresponding to each frame; and grouping the plurality of frames into the plurality of speech segments based on the classifications.

The transcription tool displays a text box for each of the plurality of speech segment by the transcription tool in the transcription interface, plays one of the plurality of speech segments by the transcription tool; receives a completed transcription of the speech segment in the text box for the playing speech segment from the user or a non-speech indication; and automatically advances to a next speech segment of the plurality of speech segments by the transcription tool. These steps are repeated for each speech segment.

BRIEF DESCRIPTION OF THE SEVERAL VIEWS OF THE DRAWINGS

FIG. 10A illustrates a screenshot of the beginning of the transcription process.

FIG. 10B illustrates a user beginning the transcription initiating the playing of a speech segment by the transcription tool.

FIG. 10C illustrates a user beginning entering the transcription into the segment's transcription field of the transcription interface while the speech segment plays.

FIG. 10D illustrates the transcription tool automatically advancing to the next speech segment, upon receiving the user's hitting of the "Return" key.

FIG. 11 illustrates a sample transcription interface with several transcriptions entered."

DETAILED DESCRIPTION OF THE INVENTION

The invention provides a method and system for semi-automatic speech transcription. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

The semi-automatic speech transcription system of the invention leverages the complementary capabilities of human and machine, building a system which combines automatic and manual approaches. With the invention, collected audio data is automatically distilled into speech segments, using signal processing and pattern recognition algorithms. The detected speech segments are presented to a human transcriber using a transcription tool with a streamlined transcription interface, requiring the transcriber to simply "listen and type". This eliminates the need to manually navigate the audio, coupling the human effort to the amount of speech, rather than the amount of audio. Errors produced by the automatic system can be quickly identified by the human transcriber, which are used to improve the automatic system performance. Likewise, the automatic system is tuned to maximize the human transcriber efficiency. The result is a system which takes considerably less time than purely manual transcription approaches to produce a complete transcription.

Overall System

Figure 1:
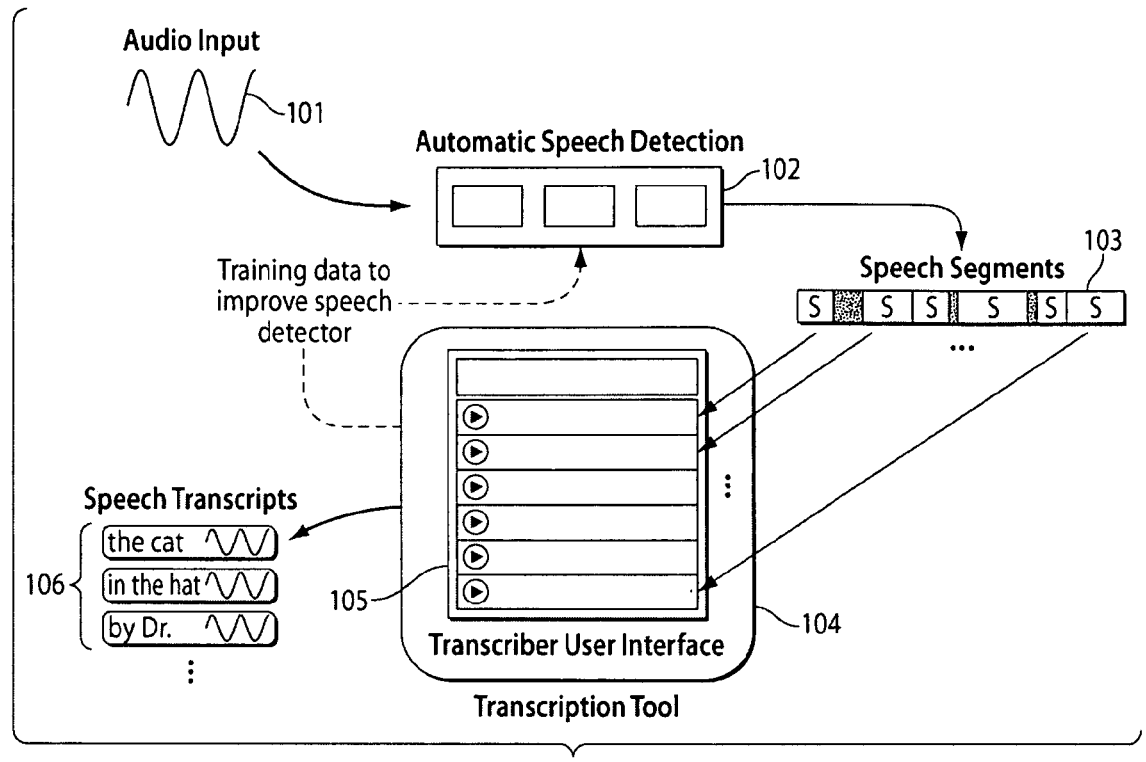
FIG. 1 illustrates an overview of the semi-automatic speech transcription system of the invention.

FIG. 1 illustrates an overview of the semi-automatic speech transcription system of the invention. The transcription system comprises two main components: the automatic speech detection component 102 and the transcription tool 104. In this embodiment, the automatic speech detection component 102 and the transcription tool 104 are implemented in software stored on a computer readable medium, and executed by a process or on a computer system. The automatic speech detection component 102 takes audio 101 as input and identifies segments of speech 103. The speech segments 103 are then loaded into the transcription tool 104, which provides the speech segments 103 to a human transcriber via the transcriber user interface 105. The transcription tool 104 plays each speech segment 103 and receives annotations from the human transcriber via the transcriber user interface 105. The annotations can be a transcript of the speech segment or some other annotation if the speech segment cannot be transcribed. The speech transcripts 106 can then be output by the transcription tool 104.

Since the speech transcription system of the invention automates the detection of speech, the need for manual navigation of the audio by the human transcriber is avoided. Because a transcription interface is used to facilitate the transcription of the speech segments by a human transcriber, increased efficiency of the transcription is realized while also avoiding the inaccuracies of automated transcription. This semi-automatic approach thus significantly increases the efficiency and accuracy of the overall transcription process.

The components of the semi-automatic speech transcription system are described in more detail below.

Automatic Speech Detection

Figure 2:
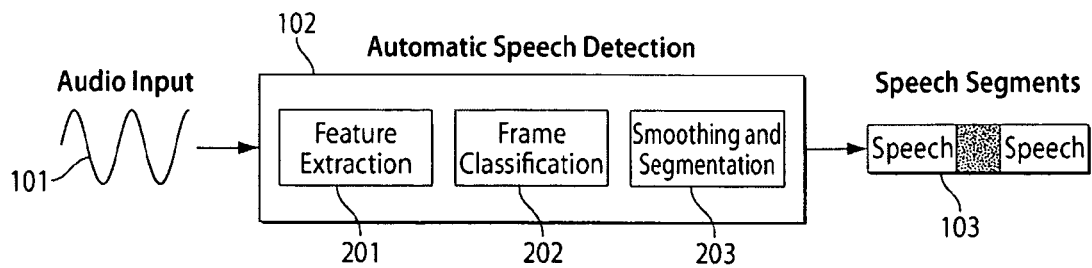
FIG. 2 illustrates in more detail the automatic speech detection component of the speech transcription system of the invention.

FIG. 2 illustrates in more detail the automatic speech detection component 102 of the speech transcription system of the invention. The automatic speech detection component 102 receives audio 101 as input and identifies segments of speech 103 as output. These speech segments 103 are time markers of the start- and end-points of speech in the audio 101. The automatic speech detection component 102 finds speech segments using a statistical pattern recognition system that has been trained to distinguish between speech and non-speech.

Figure 3:
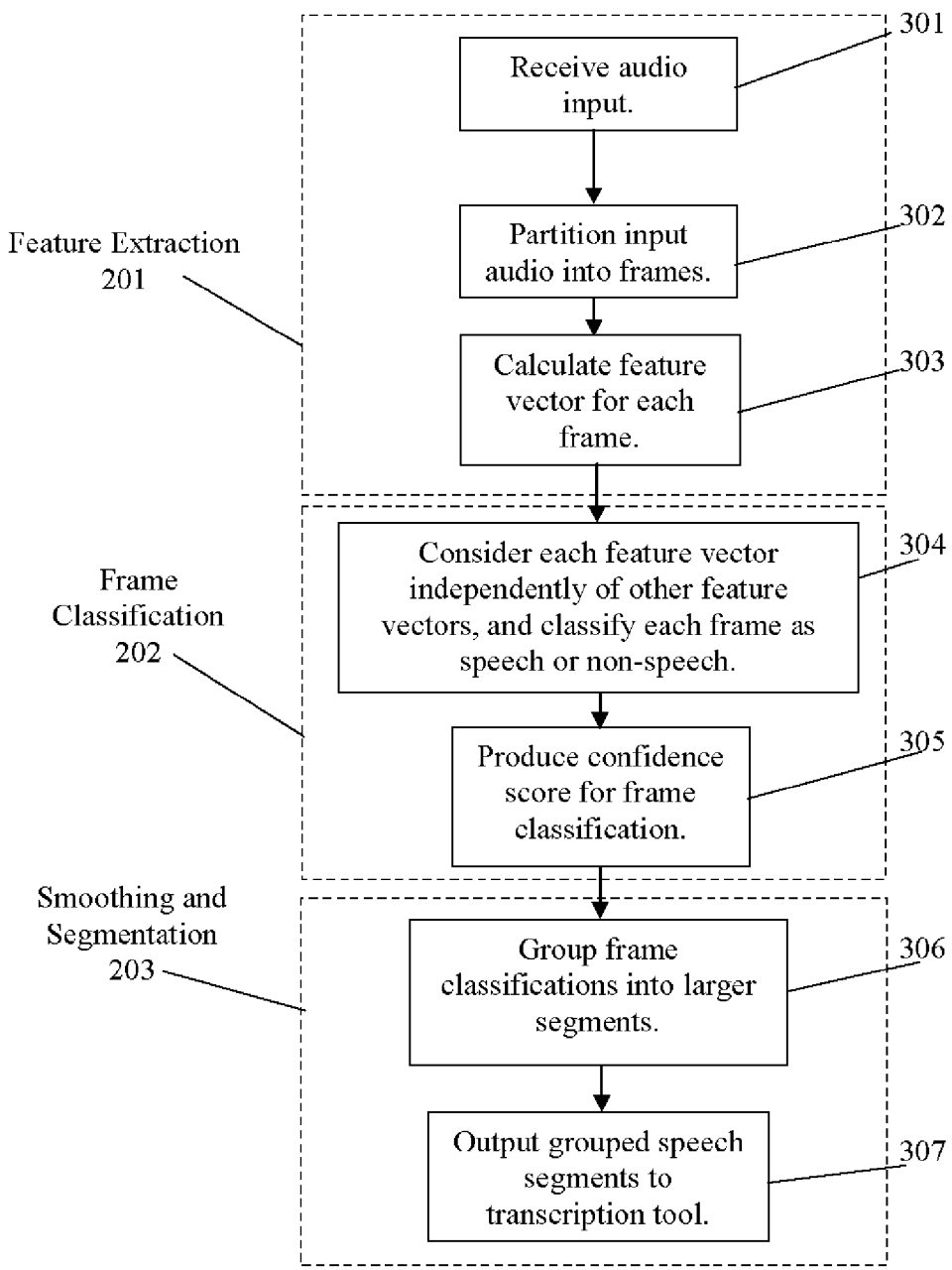
FIG. 3 is a flowchart illustrating the automatic speech detection process.

The automatic speech detection component 102 comprises three main components: feature extraction 201, frame classification 202, and smoothing and segmentation 203. Each component 201-203 processes its input and passes the output to the next component. FIG. 3 is a flowchart illustrating the automatic speech detection process. The automatic speech detection process and the components 201-203 are described below.

Feature Extraction

The feature extraction 201 processes the audio input 101 and outputs a sequence of feature vectors. Referring to FIG. 3, the feature extraction component 201 first receives the audio 101 as input (step 301). Next, the feature extraction component 201 partitions the input audio 101 into frames of audio (step 302). In this embodiment, each frame is very short, approximately 30 milliseconds in length, but a frame can be a different length based on the amount of audio that is desired to be in each frame. Then, a feature vector is calculated for each frame (step 303). To calculate the feature vector for a frame, different calculations are performed, the results of all of which are assembled into the feature vector.

Figure 4:
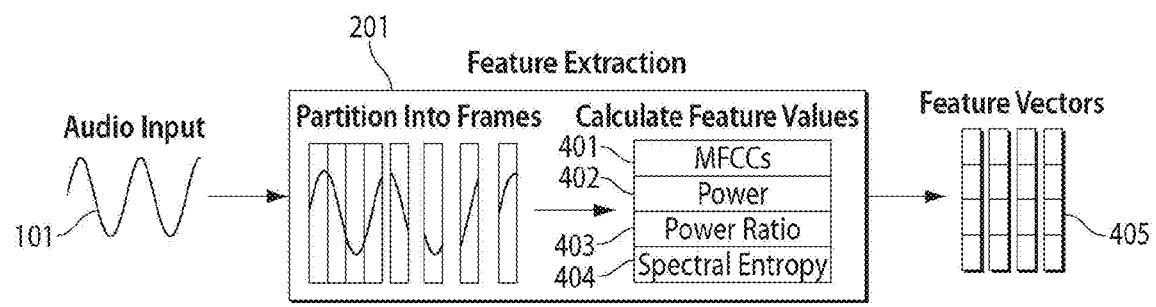
FIG. 4 illustrates in more detail the feature extraction process of the automatic speech detection process.

As illustrated in FIG. 4, in this embodiment, the primary feature values used are mel-frequency cepstral coefficient (MFCCs) 401, which represent information about the frequency content of the frame. The power 402 (volume) of the audio is also measured, as is the ratio of the power 403 in different frequency bands. The spectral entropy 404 measures how spread the power is across different frequency bands. Other feature values could also be computed, which would be appended to the feature vector 405 for the frame.

The choice of features to calculate for the feature vector directly influences the success of the frame classification at the next stage. Consider the enormous variety of sounds that constitute speech as well as non-speech. Audio is a dynamic, rapidly changing signal, but clearly there is some acoustic structure that distinguishes human speech from other sounds, such as a telephone ringing or water running in the sink. The features of interest for the feature vector are those that capture the basic characteristics of the sound of speech that are common across different speakers, yet unique relative to the myriad of other sounds in a typical environment. The goal of the feature extraction can be summarized as follows: preserve information that is helpful for distinguishing speech audio from non-speech audio; and discard information which is irrelevant to the classification task.

Feature selection is one of the primary challenges in designing a classification system. To illustrate the challenge, consider the problem of distinguishing silence from speech. Since silence is just an audio signal with zero volume, then the volume (power) feature of the signal would be a good discriminator in this embodiment of the speech transcription system, the power is the root mean squared (RMS) value of the audio samples in the frame.

While power may be sufficient for separating speech from silence, power alone fails to distinguish speech from other sounds. We can look at a visual representation of audio for clues about other features that may be useful.

Figure 5:
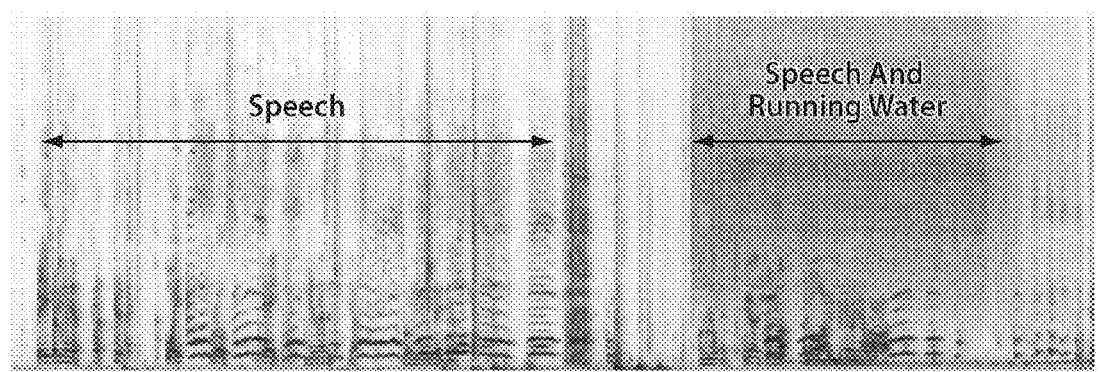
FIG. 5 illustrates a sample spectrogram.

FIG. 5 illustrates a sample spectrogram. The spectrogram shows the frequency content (spectrum) of an audio signal over time. Time proceeds from left to right on the x-axis, where the y-axis is the frequency axis, and where the darkness at a point shows the power of a particular frequency at a particular point in time. Therefore, a block of all white would be complete silence. If the only sound in the audio were a pure tone (sine wave) of an "A" note (frequency=440 Hz), there would be a single horizontal line at that frequency. The region of speech displayed in FIG. 5 shows that speech consists of multiple frequencies, spaced at approximately regular intervals along the frequency axis. Running water, on the right, is a uniform gray because it consists of all frequencies with roughly equal power (though perhaps more of the power is concentrated at the higher frequencies).

Viewing a spectrogram suggests that running water has a flat spectrum over all frequencies, while speech has a series of peaks. MFCCs capture the series of peaks characteristic of speech. A measure called the spectral entropy can be used to capture the degree of "flatness" of a spectrum, so the spectral entropy feature was chosen since it could be useful in representing sounds similar to that of running water.

In this embodiment of the speech transcription system, audio is typically sampled at 48 KHz, and partitioned into frames that are 30 milliseconds long. That means that a single frame of audio contains 1440 sample values. After feature extraction, that same frame is represented with only 19 feature values. While this reduction has discarded a huge amount of information, it successfully reveals the structure relevant to the next stage of frame classification.

Frame Classification

Returning to FIG. 2, the feature vectors 405 are output from the feature extraction component 201 and input to the frame classification component 202. In this embodiment, the frame classification component 202 is a "frame-level' classifier, i.e., the component 202 produces a separate classification for each frame. As illustrated in FIG. 3, the frame-level classifier considers each feature vector independently of the other feature vectors, classifies each frame as speech or non-speech (step 304), and optionally produces a confidence score for the frame classification (step 305). Steps 304-305 are applied to each feature vector extracted from the input audio 101, after which, the audio 101 has been reduced to a sequence of labels of speech and non-speech with the associated confidence scores. Steps 304 and 305 can be performed either serially or simultaneously. The use of the confidence score is described further below in the section, Improving the Automatic Speech Detection.

Some prior art systems that perform sound classification and segmentation on audio streams do not use an intermediate frame-level classifier. Instead, they may use the full feature vector to update probabilities of speech and non-speech as the feature vector sequence evolves in time. While this may be effective, such prior art systems may not be able to easily incorporate elaborate discriminative classifiers that do not necessarily provide valid probabilities. The discriminative frame-level classifier used by the invention successfully discriminates between speech and non-speech, even on very short, 30 ms frames of audio, using the features described in the previous section.

The frame-level classifier used in this embodiment of the invention is based on a decision tree classifier. A decision tree makes a sequence of decisions based on the input feature vector to determine a classification. All classifications begin by making the comparison specified at the root of the tree (the root is the top-most node). The result of that comparison selects one of the root's children for the next decision, and so on down the tree until the bottom is reached, at which point a classification is issued.

Figure 6:
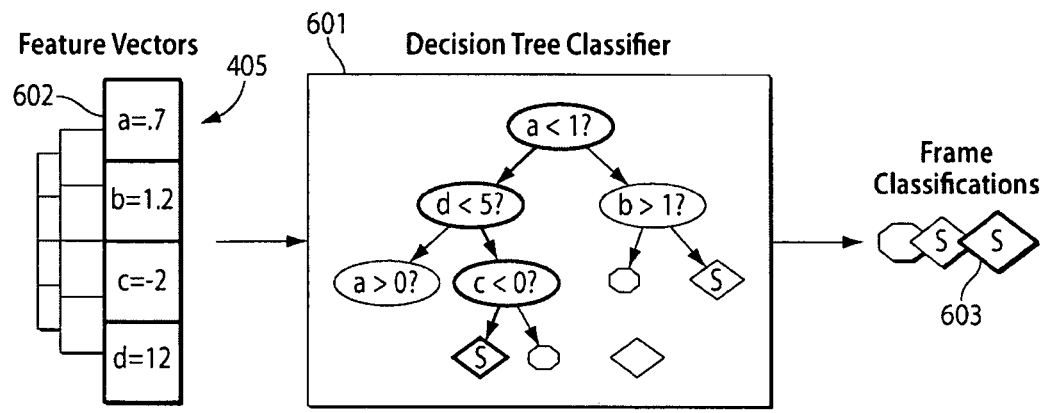
FIG. 6 illustrates an example with a small decision tree and feature vectors.

To explain conceptually the decision tree classifier algorithm, consider the example illustrated in FIG. 6. FIG. 6 illustrates an example with a small decision tree 601 and feature vectors 405 consisting of only four arbitrary features, labeled "a", "b", "c", and "d". The illustrated scenario traces a classification of the feature vector 602, shown in bold, which has values (a=0.7, b=1.2, c=−2, d=12). The nodes that are evaluated in this example are also shown in bold:

1) Check the value of a. a=0.7, and since a<1, go to the left branch.

2) Check the value of d. d=12 and is greater than 5, so go right.

3) Check the value of c. c=−2, and since c<0 go left.

4) Reaching the bottom of the tree, the resulting classification is speech.

The frame classifications 603 are then output to the smoothing and segmentation component 203.

Smoothing and Segmentation

Figure 7:
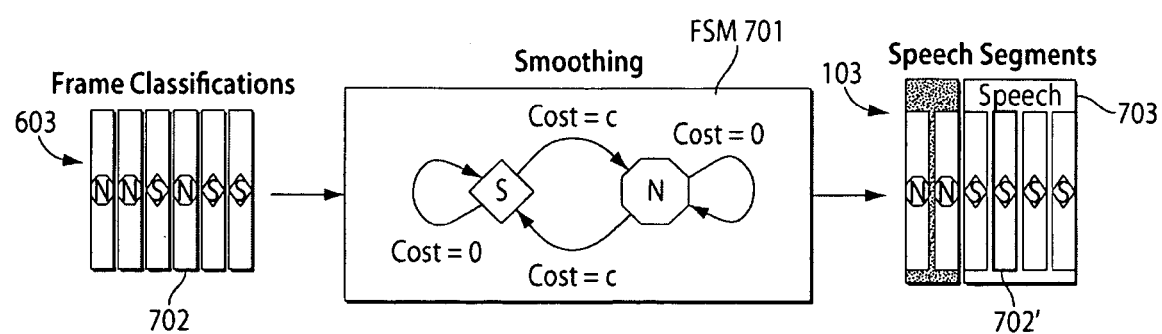
FIG. 7 illustrates in more detail the smoothing and segmentation component.

FIG. 7 illustrates in more detail the smoothing and segmentation component 203. The frame classifications 603, and their associated confidence scores, are output from the frame classification component 202 and input to the smoothing and segmentation component 203. Referring to both FIGS. 3 and 7, the smoothing and segmentation component 303 groups the frame classifications into larger segments (step 306). The grouped speech segments are then output to the transcription tool 104 (step 307).

In this embodiment, the smoothing and segmentation component 303 is built on top of a finite state machine (FSM) 701. The FSM 701 has two states: speech and non-speech. A sequence of frame classifications 603 is presented to the FSM 701. For each frame classification 603, the FSM 701 assigns two types of costs: a cost for switching states and a cost for being in a state that differs from the current frame classification. The goal of the FSM 701 is to attempt to balance between these two competing costs and to find the minimum cost sequence of states.

Consider two extreme scenarios. First, imagine there is an infinite cost to switching states. In that case, the FSM 701 would minimize costs by ignoring the incoming frame classification sequence 603 and simply remain in a single state (speech, for example). Then the whole audio stream would be considered speech. Alternatively, if there were no costs to switching states, then FSM 701 would switch states whenever the frame classification changes, and there would be too many short, spurious segments of speech.

In the example illustrated in FIG. 7, the frame 702 of the frame classifications 603 has been labeled as non-speech (N). The FSM 701 has relabeled the frame 702' as speech (S). The resulting group of speech frames is gathered into a speech segment 703.

Figure 8:
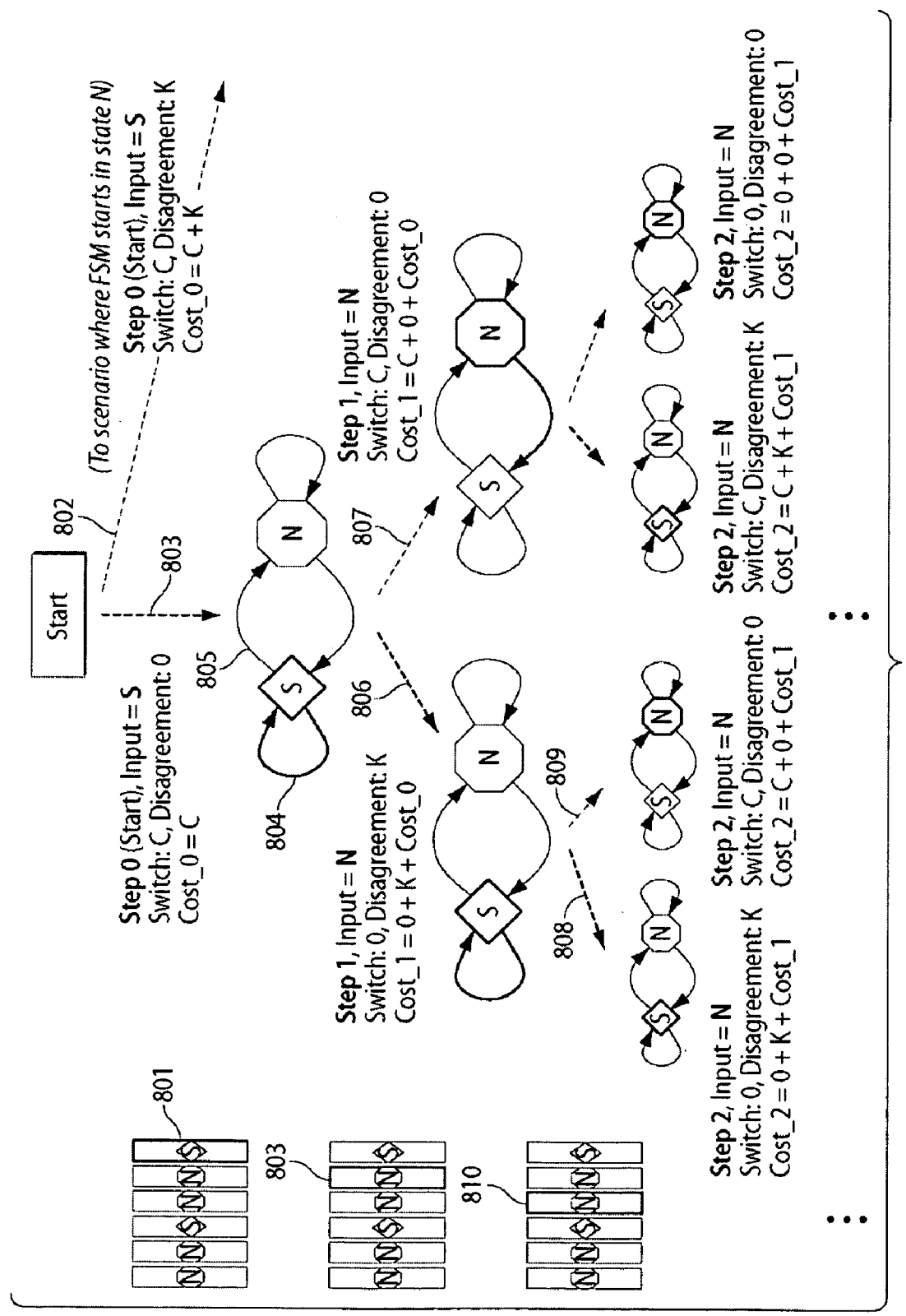
FIG. 8 illustrates an example of the FSM smoothing a sequence of frame classifications.

FIG. 8 illustrates an example of the FSM 701 smoothing a sequence of frame classifications. Imagine a sequence of frame classifications 801: S,N,N,S,N,N, where "S" represents a speech classification and "N" represents a non-speech classification. The example illustrates the first three steps in the operation of the FSM 701.

In step 0, the first frame classification 801, "S" is examined. By convention, the FSM 701 is said to be in a third "start" state, and so it must transition to state S or N, paying the associated state transition cost C. FIG. 8 illustrates the transition to state S (following line 803), which incurs a state transition cost but does not incur a frame disagreement cost.

The alternative transition to state N (following line 802 but not shown) would incur both a state transition cost C and a frame disagreement cost of K. The total cost after step 0 is denoted as cost_0.

To go from step 0 to step 1, the next frame classification 803 is examined, which is "N". The FSM 701 has two options. It can remain in state "S" (indicated by arrow 804 in step 0) or it can transition to state "N" (indicated by arrow 805 in step 0). This results in two possible scenarios. On the left is the scenario in which the FSM 701 transitions to state S, and on the right is the scenario in which the FSM 701 transitions to state N. The associated cost for each scenario is then determined. Taking the arrow 806 (remaining in state S), there is no state transition cost, but there is a cost K of disagreeing with the frame classification, which is N. On the other hand, taking the arrow 807 (switching to state N), there is a transition cost of C, but no disagreement cost. Conceptually, the local cost at each transition is the transition cost (if a state transition was taken) plus the disagreement cost (if the state disagrees with the input frame classification). The local cost moving from step 0 to 1 can be denoted as localcost(0,1), indicating that it is for transitions from step 0 to 1. The total cost at the current step is the local cost at that step, plus the total cost from the previous step. So, the total cost at step 1 is cost 1=localcost(0,1)+cost_0.

To go from step 1 to step 2, there are now two possible stating scenarios, which were the two outcomes from the previous step. If we were in state S following step 1, then as before, the arrow 808 can be taken to remain in state S, or the arrow 809 can be taken to switch to state N. The frame classification 810 under consideration for step 2 is N. The local cost structure is the same as above, except that now there are two possible starting scenarios so there are four possible result scenarios. Note the different local costs for each of the four scenarios at the far right, there is no local cost. However, the total cost reflects the accumulated cost over all the steps leading to this particular scenario.

After all frame classifications have been sent through the FSM 701, the scenario with the least total cost is identified. The history of state sequences that led to this scenario is the resulting minimum cost state sequence. In this embodiment, the cost structure is set up so that, when the minimum cost state sequence is found, the best quality smoothed state sequence is also found.

There is a lot of accounting of local and total costs, and the number of possible "scenarios" doubles at each step. Fortunately, the technique of dynamic programming (e.g. the Viterbi algorithm) can be used to quickly find the minimum cost state sequence. It relies on the observation that after every step, the FSM 701 can be in one of two states: S or N. So all that the algorithm needs to remember is which preceding scenario led to state S with minimum total cost, and which scenario led to state N with minimum total cost.

Transcription Tool

The transcription tool 104 (FIG. 1) receives speech segments 103 output by the automatic speech detection component 102. In this embodiment, the transcription tool 104 is a software program, which when executed by a computer, provides a transcription interface 105 on a display coupled to the computer. A human transcriber/user interfaces with the transcription interface 105 to facilitate the transcription of the speech segments 103.

The transcription interface 105 focuses the transcriber's entire effort on listening to speech segment, and typing transcripts. The core interface elements are text boxes, with one for each segment. The user can play (or replay) a segment with a key press, type the transcript, and advance to the next segment using only the keyboard. Since the automatic audio detection component 102 is tuned to produce short speech segments that the human transcriber can easily remember, the need to replay segments is minimized. By relying only on the keyboard, no extra time is needed to physically switch between keyboard and mouse.

Figure 9:
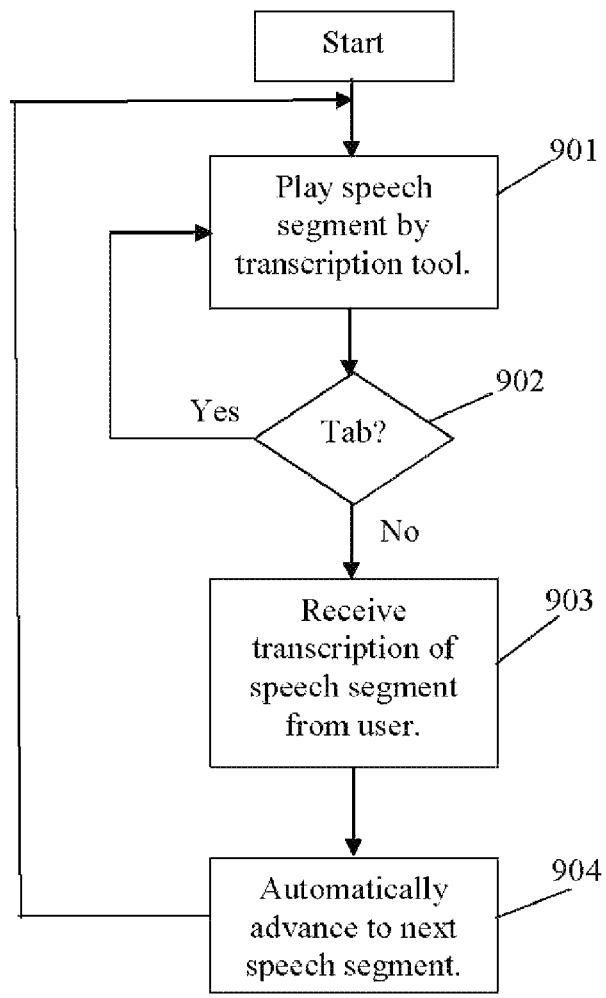
FIG. 9 is a flowchart illustrating the transcription process using the transcription tool.

FIG. 9 is a flowchart illustrating the transcription process using the transcription tool 104 of the invention. The transcription tool 104 starts by playing a speech segment received from the automatic speech detection component 102 (step 901). The user can hit a key on a keyboard, such as the "Tab" key, to replay the speech segment (step 902). The user then inputs the transcription of the speech segment via the transcription interface 105. The transcription tool 104 receives the transcription of the speech segment from the user (step 903). The user indicates the completion of the transcription of this speech segment by hitting another key on the keyboard, such as the "Return" key. Upon completion of the transcription of one speech segment, the transcription tool 104 automatically advances to the next speech segment (step 904). The process is then repeated for this and successive speech segments. Through this process, the transcription proceeds naturally with the user's speed, rather than the user needing to adjust to the transcription tool 104.

Figure 10A:
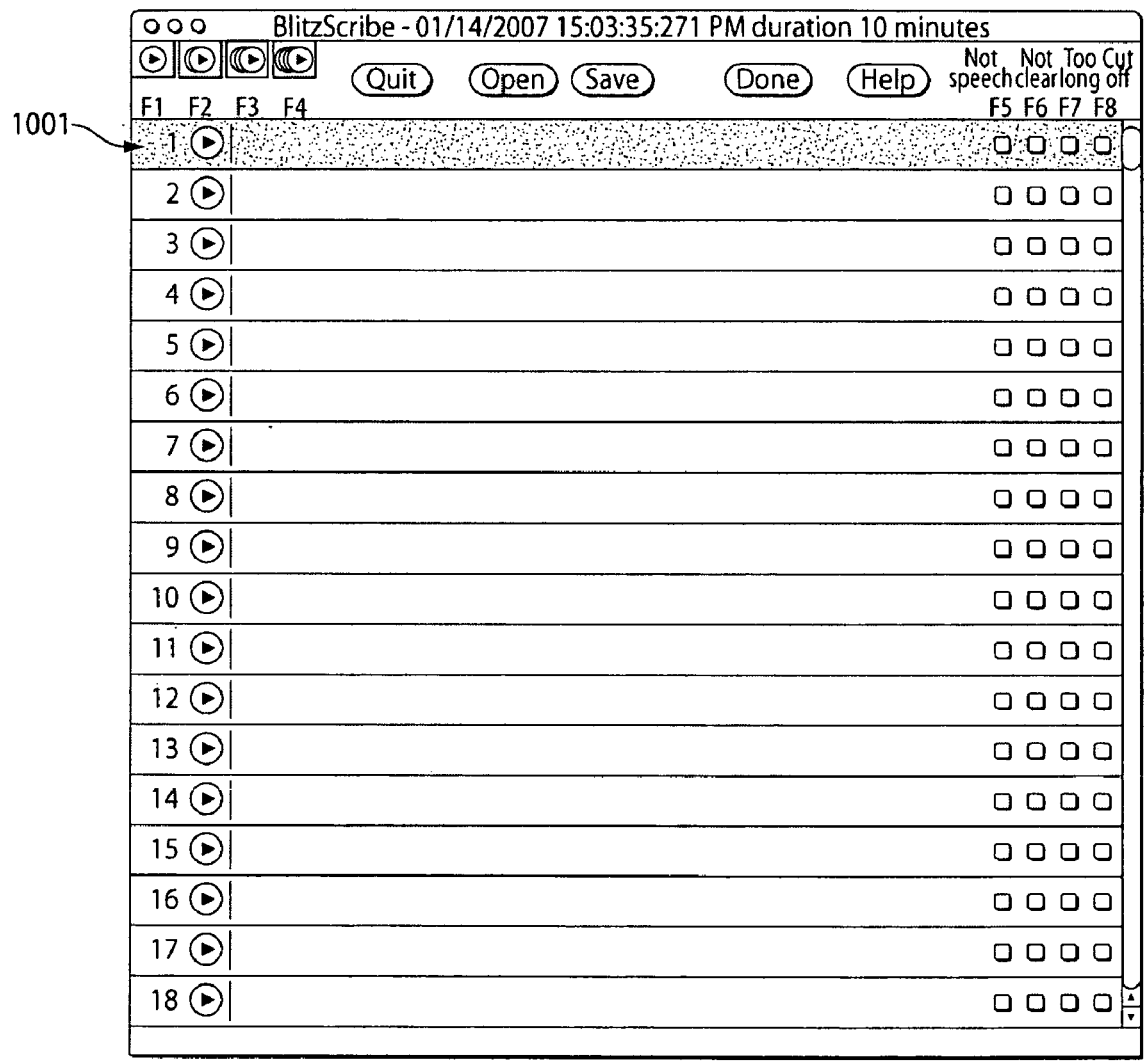
FIGS. 10A-10D illustrate examples of the transcription interface.
Figure 10B:
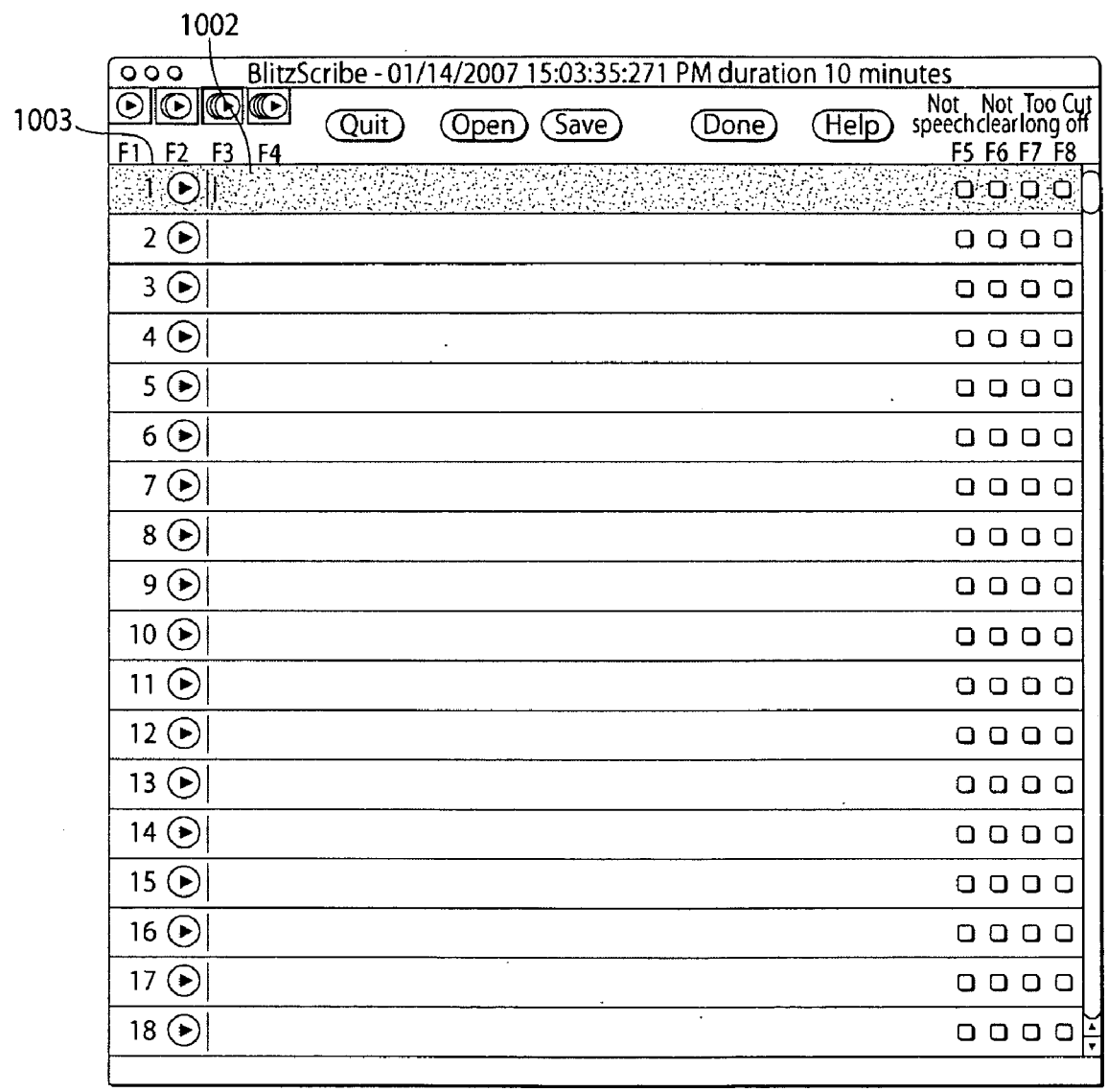
Figure 10C:
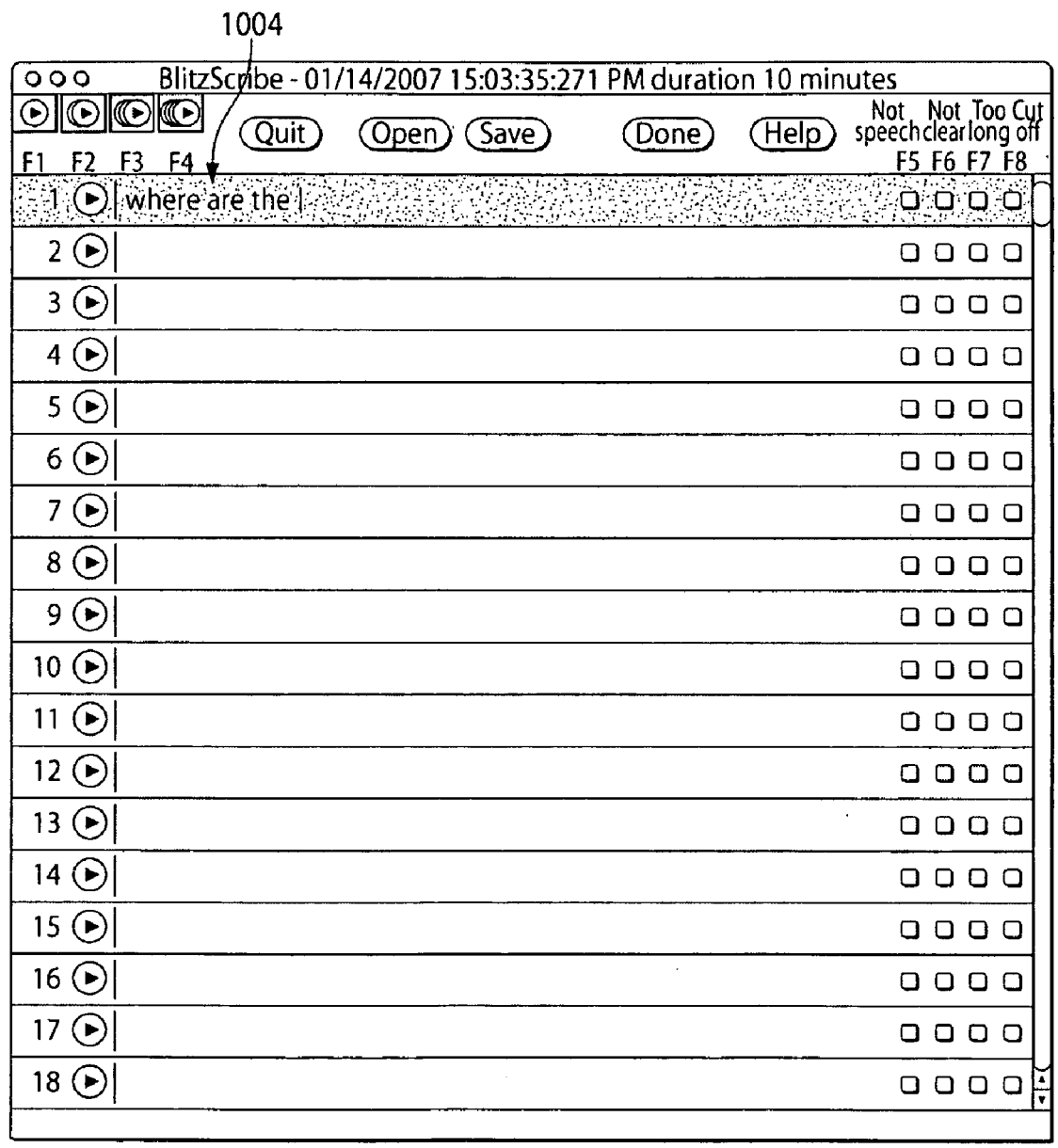
Figure 10D:
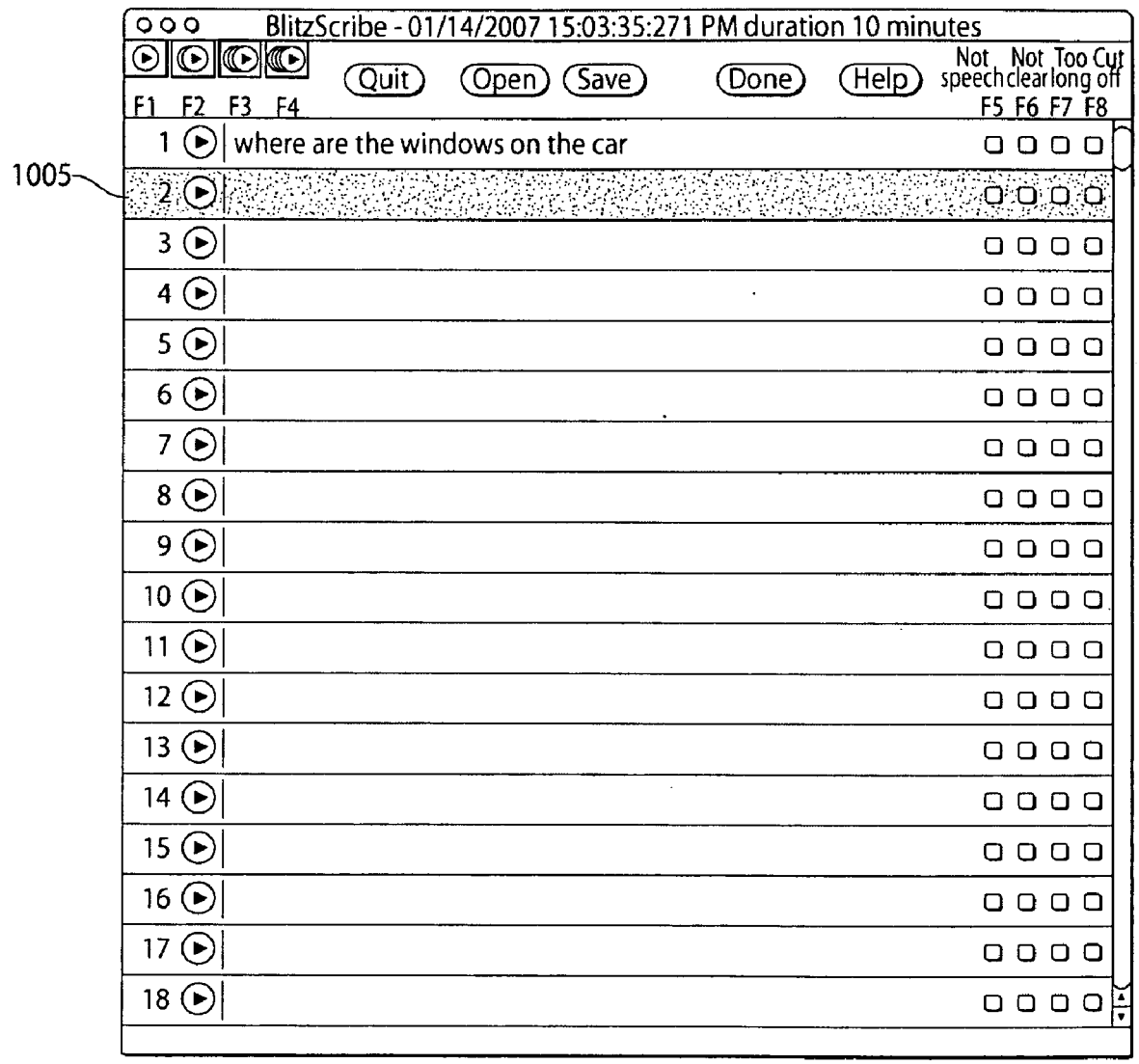

In this embodiment, the transcription process is optimized by streamlining the transcription interface 105. FIGS. 10A-10D illustrate examples of the transcription interface 105. FIG. 10A illustrates a screenshot of the beginning of the transcription process. The transcription interface 105 beings by displaying a list of speech segments 1001 to be transcribed. As illustrated in FIG. 10B, the user begins the transcription initiating the playing of a speech segment 1002 by the transcription tool 104 (step 901). The highlighted "play" icon 1003 indicates that the speech segment 1002 is playing. If the user hits the "Tab" key, the transcription tool 104 replays the speech segment 1002 (step 902). As illustrated in FIG. 10C, the user begins entering the transcription into the segment's transcription field 1004 of the transcription interface 105 while the speech segment 1002 plays. When the user has finished entering the transcription, the user hits the "Return" key. The transcription tool 104 receives the transcription (step 903) and stores the transcription in a metadata database (not shown). As illustrated in FIG. 10D, upon receiving the user's hitting of the "Return" key, the transcription tool 104 automatically advances to the next speech segment (step 904). This next speech segment 1005 is then highlighted on the transcription interface 105. Steps 901 through 904 are then repeated for this speech segment 1005.

FIG. 11 illustrates a sample transcription interface 105 with several transcriptions entered. Indications other than the transcription of a speech segment can be entered by the user for various reasons. For example, in speech segment 8, a special code 1101 is used to indicate speech that the user could not understand. For another example, assume that speech segment 9 did not contain speech. In this case, the user leaves the transcript field 1103 blank and hits "Return". The transcription tool 104 then marks the "Not speech" box 1102 on the transcription interface 105. The transcription tool 104 records the speech detector error and advances to the next segment. These errors can later be used to improve the automatic speech detection.

Improving the Automatic Speech Detection

Ways in which the inventive system can be tuned to maximize human transcriber efficiency includes, but is not limited to: tuning the length of the speech segments and using the human annotated indications of speech and non-speech to retrain the automatic speech detection component 202.

As explained above, the smoothing and segmentation component 203 groups the sequence of frame classifications into speech segments 103. However, if there is a lot of continuous speech, the smoothing and segmentation component 203 may output a very long speech segment, one that is too long for a transcriber to listen to and remember everything that was said. To address this problem, minimum and maximum length thresholds for a speech segment can be set and tuned. When a speech segment exceeds the maximum threshold, the speech segment may be split into multiple speech segments. If each frame classification has been given a confidence score, as described above, the confidence score can be used to determine where to split the speech segment. The split should be at an appropriate place in the speech, for example, we don't want to split the segment in the middle of a word. Appropriate splitting points can be where there were short pauses (silences or low volume) or where the frame-level classifier isn't certain that the frame contained speech (i.e., had a low confidence score.) The same is true for where the frame classifier had not labeled a frame as speech but the smoothing and segmentation component 203 had relabeled it as speech. The splitting process determines where the minimum confidence points are in the long segment, and then splits the segment at these points, provided that no new speech segment is shorter than the minimum threshold. In this manner, the split points are chosen in a principled way. Short, easily-transcribed segments can be created, which have a lower chance of clipping the audio at inappropriate places.

When a speech segment is erroneously labeled as speech, this type of error is a false positive. Likewise, a speech segment that is missed by the system is a false negative. In this embodiment, the confidence threshold of the frame-level classifier, described above, can be tuned to decide when to output a particular classification, hence affecting the false positive and negative rates.

Further, as illustrated in FIG. 11, when the user indicates that speech segment 9 does not contain speech, this provides useful information back to the transcription system. In effect, a byproduct of the transcription is a training set—a set of human-labeled example audio clips of speech and non-speech. Because classification by the frame-level classifier is a complicated function of the input feature vector to a set of output labels, it is very hard for a human to build a classifier by hand. Instead, it is usually easier to provide a set of example classifications to a training algorithm, and rely on the algorithm to build the classifier. The set of example classifications is the training set. The training algorithm used in the inventive system processes the training set and produces a decision tree classifier.

Because there is such an enormous variety of speech and non-speech sounds, it is hard to build a training set which is sufficiently representative. Therefore, in the course of speech transcription, users are expected to encounter new examples of speech (or non-speech) that can lead to error. By incorporating these examples into the training set and rebuilding the classifier, the system can be improved.

For all of the foregoing reasons, the Detailed Description is to be regarded as being in all respects exemplary and not restrictive, and the breadth of the invention disclosed herein is to be determined not from the Detailed Description, but rather from the claims as interpreted with the full breadth permitted by the patent laws.

We claim:

1. A method for providing semi-automatic speech transcription, comprising:
   (a) receiving audio by an automatic speech detection component;
   (b) automatically detecting speech in the audio by the automatic speech detection component, wherein the automatically detecting comprises
      (b1) partitioning the audio into a plurality of frames;
      (b2) classifying each of the plurality of frames as speech or non-speech based on the feature vector corresponding to each frame; and
      (b3) grouping the plurality of frames into a plurality of speech segments based on the classifications, wherein the grouping comprises, for a sequence of classifications, switching or not switching the speech or non-speech classification in the sequence based on a comparison of a cost for switching the classification with a cost for not switching the classification;
   (c) providing by the automatic speech detection component the detected speech as the plurality of speech segments to a transcription tool;
   (d) providing by the transcription tool each of the plurality of speech segments to a user via a transcription interface; and
   (e) receiving by the transcription tool via the transcription interface an indication for each of the plurality of speech segments from the user, wherein the indication comprises a transcription of the speech segment or an indication of non-speech for the speech segments.

2. The method of claim 1, wherein the automatically detecting (b) further comprises:
   (b4) calculating a feature vector for each of the plurality of frames.

3. The method of claim 2, wherein the feature vector of a frame of the plurality of frames comprises one or more of the following:
   a frequency content of the frame;
   a power of the audio in the frame;
   a power ratio in different frequency bands of the frame; and
   a spectral entropy for the frame.

4. The method of claim 2, wherein a length of each frame is set based on an amount of audio to be in each frame.

5. The method of claim 1, wherein the classifying (b2) is based on a decision tree classifier, wherein a sequence of decisions is made through nodes of the decision tree based on an input feature vector to determine the classification.

6. The method of claim 1, wherein the plurality of features comprises a feature vector, wherein the classifying (b2) further comprises:
   (b2i) producing a confidence score for the classification.

7. The method of claim 1, wherein the grouping (b3) further comprises:
   (b3i) grouping the frames in the sequence classified as speech into a speech segment of the plurality of speech segments.

8. The method of claim 1, wherein the providing (d) and the receiving (e) comprise:
   (d1) displaying a text box for each of the plurality of speech segments by the transcription tool;
   (d2) playing one of the plurality of speech segments by the transcription tool;
   (e1) receiving a completed transcription of the speech segment or a non-speech indication in the text box for the playing speech segment from the user; and
   (e2) automatically advancing to a next speech segment of the plurality of speech segments by the transcription tool, wherein (d2), (e1), and (e2) are repeated for each speech segment.

9. The method of claim 1, wherein the indication further comprises an indication that the speech segment cannot be transcribed.

10. The method of claim 1, further comprising:
(f) creating a training set from the speech segments with indications of speech and non-speech; and
(g) using the training set to improve the detecting (b).

11. A tangible computer readable medium with program instructions for providing semi-automatic speech transcription, the program instructions executed by a computer, the instructions comprising:
(a) receiving audio by an automatic speech detection component;
(b) automatically detecting speech in the audio by the automatic speech detection component, wherein the automatically detecting comprises
  (b1) partitioning the audio into a plurality of frames;
  (b2) classifying each of the plurality of frames as speech or non-speech based on the feature vector corresponding to each frame; and
  (b3) grouping the plurality of frames into a plurality of speech segments based on the classifications, wherein the grouping comprises, for a sequence of classifications, switching or not switching the speech or non-speech classification in the sequence based on a comparison of a cost for switching the classification with a cost for not switching the classification;
(c) providing by the automatic speech detection component the detected speech as a plurality of speech segments to a transcription tool;
(d) providing by the transcription tool each of the plurality of speech segments to a user via a transcription interface; and
(e) receiving by the transcription tool via the transcription interface an indication for each of the plurality of speech segments from the user, wherein the indication comprises a transcription of the speech segment or an indication of non-speech for the speech segments.

\* \* \* \* \*